United States Patent
Nishio

(10) Patent No.: US 8,205,212 B2
(45) Date of Patent: *Jun. 19, 2012

(54) INFORMATION PROCESSING APPARATUS, INFORMATION PROCESSING METHOD, ALTERNATE RESPONSE APPARATUS, RESPONSE METHOD, CONTROL PROGRAM, AND NETWORK SYSTEM

(75) Inventor: Masahiro Nishio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

This patent is subject to a terminal disclaimer.

(21) Appl. No.: 11/868,091

(22) Filed: Oct. 5, 2007

(65) Prior Publication Data

US 2008/0034127 A1 Feb. 7, 2008

Related U.S. Application Data

(62) Division of application No. 10/114,045, filed on Apr. 3, 2002, now Pat. No. 7,316,022.

(30) Foreign Application Priority Data

Apr. 19, 2001 (JP) .................................. 2001-120449
Feb. 28, 2002 (JP) .................................. 2002-053627

(51) Int. Cl.
G06F 13/00 (2006.01)
G06F 9/44 (2006.01)
G06F 3/00 (2006.01)
G06F 15/177 (2006.01)

(52) U.S. Cl. ........ 719/312; 717/168; 717/169; 717/170; 717/171; 717/172; 710/8; 709/221

(58) Field of Classification Search .................. None
See application file for complete search history.

(56) References Cited

U.S. PATENT DOCUMENTS

| | | |
|---|---|---|
| 5,809,329 A | 9/1998 | Lichtman et al. |
| 6,286,038 B1 | 9/2001 | Reichmeyer et al. |
| 6,301,012 B1 | 10/2001 | White et al. |
| 6,421,069 B1 | 7/2002 | Ludtke et al. |
| 6,456,306 B1 | 9/2002 | Chin et al. |
| 6,621,589 B1 | 9/2003 | Al-Kazily et al. |
| 6,732,170 B2 | 5/2004 | Miyake et al. |

(Continued)

FOREIGN PATENT DOCUMENTS

JP 61-131934 6/1986

(Continued)

OTHER PUBLICATIONS

Japanese Office Action dated, Jan. 13, 2009, issued during prosecution of related Japanese application No. 2006-276894.

*Primary Examiner* — S. Sough
*Assistant Examiner* — Phuong Hoang
(74) *Attorney, Agent, or Firm* — Fitzpatrick, Cella, Harper & Scinto

(57) ABSTRACT

A mechanism for enabling a computer which includes an installer for providing Plug and Play (PnP) to obtain information for a network device is provided. Using an existing development resource, such as a PnP installer, a simple installation method is provided. By causing a proxy server to as a communication intermediary between the computer and a peripheral device which is not in compliance with a predetermined management method, the peripheral device can be managed using the predetermined management method.

23 Claims, 13 Drawing Sheets

U.S. PATENT DOCUMENTS

| | | |
|---|---|---|
| 6,772,420 B1 | 8/2004 | Poger et al. |
| 6,779,004 B1 | 8/2004 | Zintel |
| 2002/0059473 A1 | 5/2002 | Oshins et al. |
| 2003/0110270 A1* | 6/2003 | Copp .......................... 709/228 |
| 2003/0160993 A1 | 8/2003 | Kang |

FOREIGN PATENT DOCUMENTS

| | | |
|---|---|---|
| JP | 2000-330742 | 11/2000 |
| JP | 2000-353079 | 12/2000 |
| JP | 08-161250 | 10/2007 |

* cited by examiner

FIG. 3

| Print | |
|---|---|
| Printer | |
| Name (N) : | Acxxxxt PDFWriter ▶ | Properties (P) |
| | ¥¥DONKEY¥Canxx LASER SHOT LBP-740 |
| Status : | Acxxxxt Distillery |
| Type : | Acxxxxt PDFWriter |
| Where : | Canxx LBP-2260PS |
| Comment : | Search for and add new printer |
| | ☐ Print to : file (L) |
| Print range | Copies |
| ○ All (A) | ☑ [3][2][1]  Collate (T) [3][2][1] |
| ○ Current page (E)   ○ Selection (S) | 1 ▲▼ |
| ○ Pages (G) [____] | |
| Enter page numbers and / or page ranges. | |
| For example, 1, 3, 6, 4-8 | From the selected pages, print (R) All pages ▶ |
| Print what (W) : DOCUMENT ▶ | OK    Cancel |
| Option (O)... | |

FIG. 4

M - SEARCH * HTTP/1.1
HOST : 239.255.255.250 : 1900
MAN : "ssdp : discover"
MX : 60
ST : um : schemas - upnp - org : service : Print : 1.0
CONTENT - LENGTH : bytes in body
CONTENT - TYPE : texrt/xml : charset = "utf - 8"
SOAPACTION : "um : scheans - upnp - org : service : print : v1.0GetdriverInfomation"

<s : Envelope
  xmlns : s = "http:///schamas.xmlsoap/soap/wvelope/"
  s : encodingStyle = "http:://chemas.xmlsoap.prg/soap/encoding/"
  <s: Body>
    <u : GetDriverInformation xmlns : u = "um : schemas - upnp - org : service : serviceType : v" >
      <SupportedOS>Windows 98</SupportedOS>
      <SupportedOS>Second Edition 4.10.2222A</OSversion>
    </u : GetDriverInformation>
  </s : Body>
</s : Envelope>

FIG. 5

```
HTTP/1.1 200 OK
CACHE-CONTROL: max-age = seconds until advertisement expires
DATE: when response was generated
EXT:
LOCATION: URL for UPnP description for root device
SERVER: OS / version UPnP / 1.0 product / version
ST: urn : schemas-upnp-org : service : Print : 1.0
USN: advertisement UUID
CONTENT-LENGTH: bytes in body
CONTENT-TYPE: text / xml ; charset = " utf-8 "

<s : Envelope
   xmlns : s = "http://schemas.xmlsoap.org/soap/envelope/"
   s : encodingStyle = " http://schemas.xmlsoap.org/soap/encoding/ " >
   <s : Body>
      <u : GetDriverInformationResponse xmlns : u = " urn : schemas-upnp-
org : service : Print : 1.0 " >
         <PrinerMakeAndModel>ABC Printer Series 123</PrinerMakeAndModel>  ← DEVICE ID
         <PrinterName>My Printer</PrinterName>
         <PrinterLocation>Building A Floor 1</PrinterLocation>
         <PrinterPDL>LIPS</PrinterPDL>
         <IPAddress> 123.123.123.123</IPAddress>
         <DriverVersion>2.0</DriverVersion>
         <DriverDataSize>12345678</DriverDataSize>
         <DriverRequiredMemorySize>23456789</DriverRequiredMemorySize>
         <DriverURL>http://www.abcinc.co.jp</DriverURL>
      </u : GetDriverInformationResponse>
   </s : Body>
</s : Envelope>
```

DEVICE CONFIGURATION INFORMATION

FIG. 7

| DIRECTORY INFORMATION |
|---|
| FIRST DATA PROCESSING PROGRAM PROGRAM CODE GROUP CORRESPONDING TO STEPS OF FLOWCHART SHOWN IN FIG. 2 |
| |

FIG. 9

```
HTTP/1.1 200 OK
CACHE-CONTROL: max-age = seconds until advertisement expires
DATE: when response was generated
EXT:
LOCATION: URL for UPnP description for root device
SERVER: OS/version UPnP/1.0 product/version
ST: urn:schemas-upnp-org : service : Print : 1.0
USN: advertisement UUID
CONTENT-LENGTH: bytes in body
CONTENT-TYPE: text/xml; charset="utf-8"

<s : Envelope
     xmlns:s="http://schemas. xmlsoap. org/soap/envelope/"
     s:encodingStyle="http://schemas. xmlsoap. org/soap/encoding/ ">
  <s:Body>
    <u:GetDriverInformationResponse xmlns:u="urn:schemas-upnp-org:service:Print:1.0">
      <Printer>
        <PrinerMakeAndModel>ABC Printer Series 123</PrinerMakeAndModel>
        <PrinterName>My Printer</PrinterName>
        <PrinterLocation>Building A Floor 1</PrinterLocation>
        <PrinterPDL>LIPS</PrinterPDL>
        <IPAddress> 123. 123. 123. 121</IPAddress>
        <DriverVersion>2.0</DriverVersion>
        <DriverDateSize>12345678</DriverDateSize>
        <DriverRequiredMemorySize>23456789</DriverRequiredMemorySize>
        <DriverURL>http://www.abcinc.co.jp/driverA</DriverURL>
      </Priner>
      <Printer>
        <PrinerMakeAndModel>ABC Printer Series 222</PrinerMakeAndModel>
        <PrinterName>Her Printer</PrinterName>
        <PrinterLocation>Building B Floor 1</PrinterLocation>
        <PrinterPDL>PCL</PrinterPDL>
        <IPAddress> 123. 123. 123. 122</IPAddress>
        <DriverVersion>1.5</DriverVersion>
        <DriverDateSize>3456660</DriverDateSize>
        <DriverRequiredMemorySize>23456789</DriverRequiredMemorySize>
        <DriverURL>http://www.abcinc.co.jp/driverB</DriverURL>
      </Priner>
      <Printer>
        <PrinerMakeAndModel>ABC Printer Series 333</PrinerMakeAndModel>
        <PrinterName>His Printer</PrinterName>
        <PrinterLocation>Building C Floor 1</PrinterLocation>
        <PrinterPDL>PS</PrinterPDL>
        <IPAddress> 123. 123. 123. 123</IPAddress>
        <DriverVersion>3.0</DriverVersion>
        <DriverDateSize>12345777</DriverDateSize>
        <DriverRequiredMemorySize>45678902</DriverRequiredMemorySize>
        <DriverURL>http://www.abcinc.co.jp/driverC</DriverURL>
      </Priner>
    <u:GetDriverInformationResponse>
  </s:Body>
</s:Envelope>
```

DEVICE CONFIGURATION INFORMATION

INFORMATION PROCESSING APPARATUS, INFORMATION PROCESSING METHOD, ALTERNATE RESPONSE APPARATUS, RESPONSE METHOD, CONTROL PROGRAM, AND NETWORK SYSTEM

This application is a divisional of application Ser. No. 10/114,045, filed on Apr. 3, 2002, now U.S. Pat. No. 7,316,022, issued on Jan. 1, 2008.

BACKGROUND OF THE INVENTION

1. Field of the Invention

The present invention relates to information processing apparatuses for setting peripheral devices for performing predetermined processing through a network, to peripheral devices, to device processing methods, and to storage media.

2. Description of the Related Art

As a network infrastructure has been developed, network image processing apparatuses, such as network printers, scanners, and copy machines, have rapidly become widely used. Technology for searching a network for a device for offering various services over the network has been developed. One example of such technology proposed by Microsoft is referred to as Universal Plug and Play (hereinafter referred to as "UPnP").

When using a network peripheral device, such as a network printer, it is necessary to install beforehand, on a client (such as a personal computer) for using the printer, a corresponding driver, which has been registered and controlled in a database by an operating system (such as Windows (registered trademark)) running on the client. Alternatively, driver software (driver) can be provided by a printer vendor through a recording medium, such as a floppy disk or a CD-ROM (Compact Disc Read Only Memory). Subsequently, it is necessary to detect information (such as an IP address, printer port, print protocol to be used, and device driver) which is assigned to the peripheral device and which is used for operating the peripheral device, namely, the printer. The peripheral device may be transferred to another network, or a new peripheral device may be added to the network. The device configuration indicating devices connected to the network system changes constantly. In order to manage peripheral devices on the network, technology for detecting information for the peripheral devices and for managing the peripheral devices has been developed. A known management system, such as UPnP 1.0, is a specification designed to provide technology for interconnecting a peripheral device and a computer, however, this technology only defines a protocol and data format for enabling devices to communicate with each other.

Even when information managed by the management system, such as UPnP, is used, the peripheral device on the network can be used only by performing a complicated setting during an installation of a control program, such as a device driver, for controlling the peripheral device into the computer.

Microsoft's OS is supplied with a Plug and Play (hereinafter referred to as PnP) installer for receiving and recognizing a device number from a locally-connected peripheral device through a USB (Universal Serial Bus) and for automatically installing a device driver. PnP installation is limited to locally-connected devices. No technology has been developed for expanding the PnP technology to network devices.

When a plurality of management methods for managing network peripheral devices concurrently exists on the network, a management system compliant with a specific management method cannot recognize a peripheral device which is on the network and which is not compliant with the specific management method.

SUMMARY OF THE INVENTION

In order to solve at least one of the foregoing problems, it is an object of the present invention to provide a mechanism for enabling a user or an administrator to install a control program for controlling a peripheral device connected to a computer through a network into the computer without adding many changes to existing development resources and without causing the user or the administrator to perform complicated operations.

It is another object of the present invention to provide a mechanism for using an existing local PnP installer in the computer in order to implement the above mechanism for installing the computer program into the computer without adding many changes to the existing development resources and without causing the user or the administrator to perform complicated operations.

It is another object of the present invention to provide a mechanism for automatically installing, when the PnP installer is used, the control program by the PnP installer using information managed by a predetermined management method, such as UPnP.

It is another object of the present invention to provide a mechanism for causing, when a peripheral device connected to the network is not compliant with a predetermined management method, a proxy server for acting as an intermediary between the peripheral device and the computer to detect identification information of the peripheral device which is not compliant with the predetermined management method and to transmit the identification information of the peripheral device in a format compliant with the predetermined management method, so that the transmitted identification information can be used by the existing PnP installer.

In order to achieve at least one of the foregoing objects, according to an aspect of the present invention, for example, a network system for interconnecting through a network a peripheral device and an information processing apparatus which includes an installer for a control program for controlling the peripheral device includes an issuing module for issuing a predetermined search request for searching for the peripheral device; a response obtaining module for obtaining a response to the search request from the peripheral device, to which identification information of the peripheral device is added; a recognizing module for parsing the response to the search request and recognizing the identification information of the peripheral device; an installation controlling module for controlling the installer to start installation of the control program into the information processing apparatus using the identification information recognized by the recognizing module; a request obtaining module for obtaining the predetermined search request issued by the issuing module for searching for the peripheral device; a responding module for issuing the response to the search request obtained by the request obtaining module; an adding module for adding the identification information to a predetermined region of the response issued by the responding module in response to the search request; and a transmission controlling module for controlling transmission of the response to the search request, to which the identification information is added, to the information processing apparatus.

Other features and advantages of the present invention will become apparent from the following description taken in

BRIEF DESCRIPTION OF THE DRAWINGS

FIG. 3 illustrates an example of a print setup window displayed on a client shown in FIG. 1.

FIG. 4 illustrates an example of an HTTP request issued to a printer by the client shown in FIG. 1.

FIG. 5 illustrates an example of an HTTP response sent to the client from the printer shown in FIG. 1.

FIG. 7 illustrates a memory map of a storage medium for storing various data processing programs which are readable by a network system to which the information processing apparatus and the printer according to the present invention are applicable.

FIG. 9 illustrates an example of an HTTP response sent to the client from the proxy server.

DESCRIPTION OF THE PREFERRED EMBODIMENTS

Figure 1:
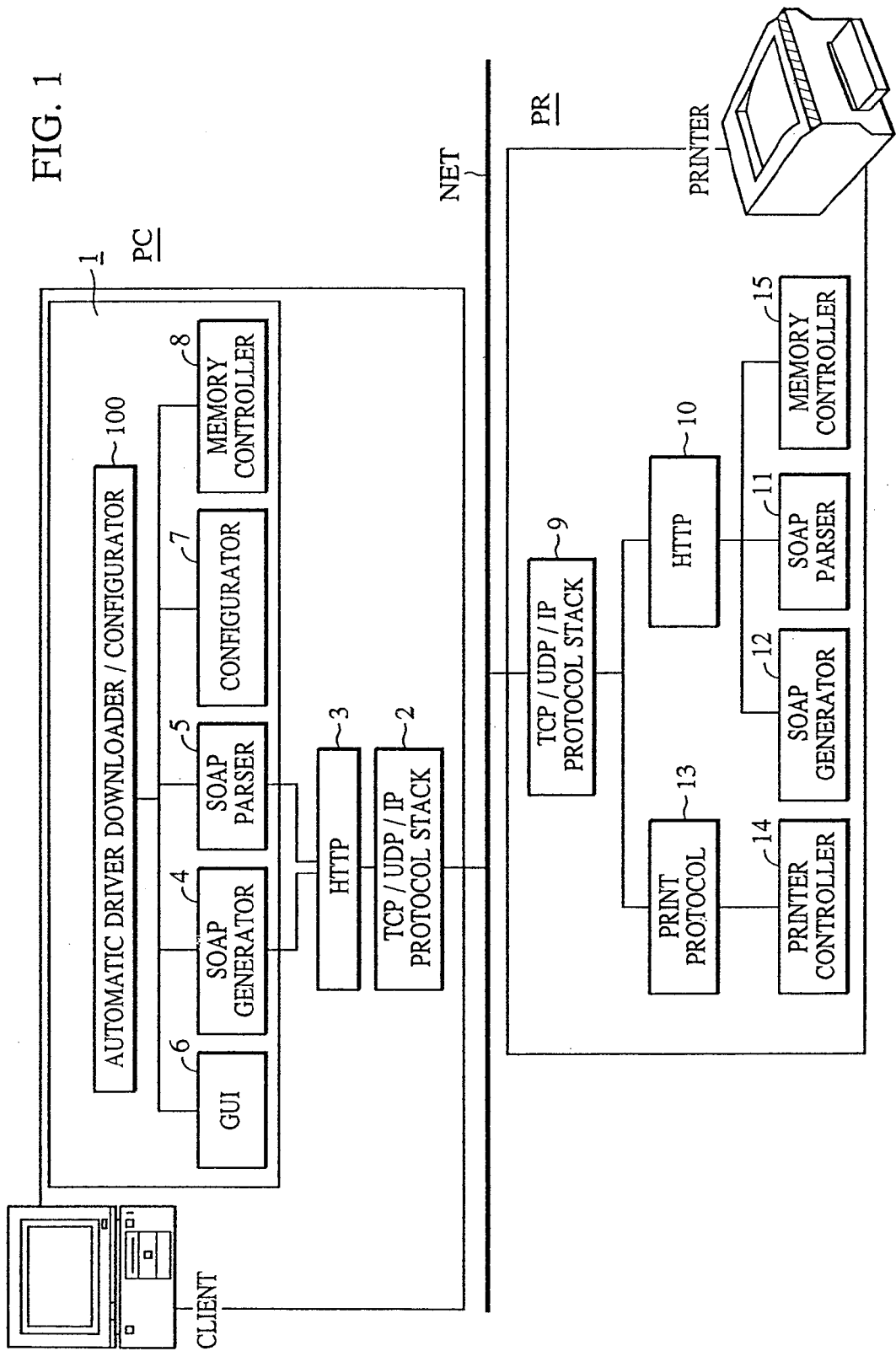
FIG. 1 is a block diagram of a print system to which an information processing apparatus according to an embodiment of the present invention is applicable.

FIG. 1 shows the configuration of a print system to which an information processing apparatus according to an embodiment of the present invention is applicable. In the print system, a client PC (hereinafter may be simply referred to as a client), which is a preferred example of the information processing apparatus of the present invention, and a printer PR as a peripheral device can communicate with each other through a network NET. The peripheral device includes an image forming apparatus, such as a printer, a copy machine, a facsimile machine, or a multifunctional machine combining these functions, or a digital camera. The present invention is formed by an application executed by the client and services included in a network printer. The application and services are formed by functional modules.

Referring to FIG. 1, an application 1 supplied with the client PC, which is a feature element of the present invention, is software running on an operating system (OS) of the client. The application 1 includes a TCP/UDP/IP protocol stack 2 as a communication function, a Hyper Text Transfer Protocol (HTTP) module 3 according to HTTP 1.1 above the protocol stack 2, a Simple Object Access Protocol (SOAP) generator 4 for issuing a SOAP request, and a SOAP parser 5 for parsing a response, which will be described below.

Application modules such as an automatic driver downloader/configurator (described below), the SOAP generator 4, and the SOAP parser 5 corresponds to the application 1.

A GUI module 6 interactively receives a request from a user and displays a processing result under the control of the application 1. A configurator 7 executes the installation of a driver obtained from the printer through the network into a recording unit in the client in accordance with network information obtained from the printer at the same time and registers driver information in the OS.

During installation, a memory controller 8 determines whether or not the memory space is sufficient for the driver and controls management of an installation destination.

In contrast, a network service, which in this embodiment is the network printer PR, includes a TCP/UDP/IP protocol stack 9 as a communication function, an HTTP module 10 according to HTTP 1.1 above the protocol stack 9, a SOAP parser 11 for parsing a SOAP request, and a SOAP generator 12 for issuing a response, which will be described hereinafter.

On the protocol stack 9, a print protocol module 13 is implemented. The print protocol module 13 has functions for parsing a printer request issued by the client PC and transmitting the request to a printer controller 14.

A memory controller 15 has functions for managing directory information for a directory containing the driver and managing data size information when generating a response, and transmitting the driver read from the recording medium to the HTTP module 10.

Figure 12:
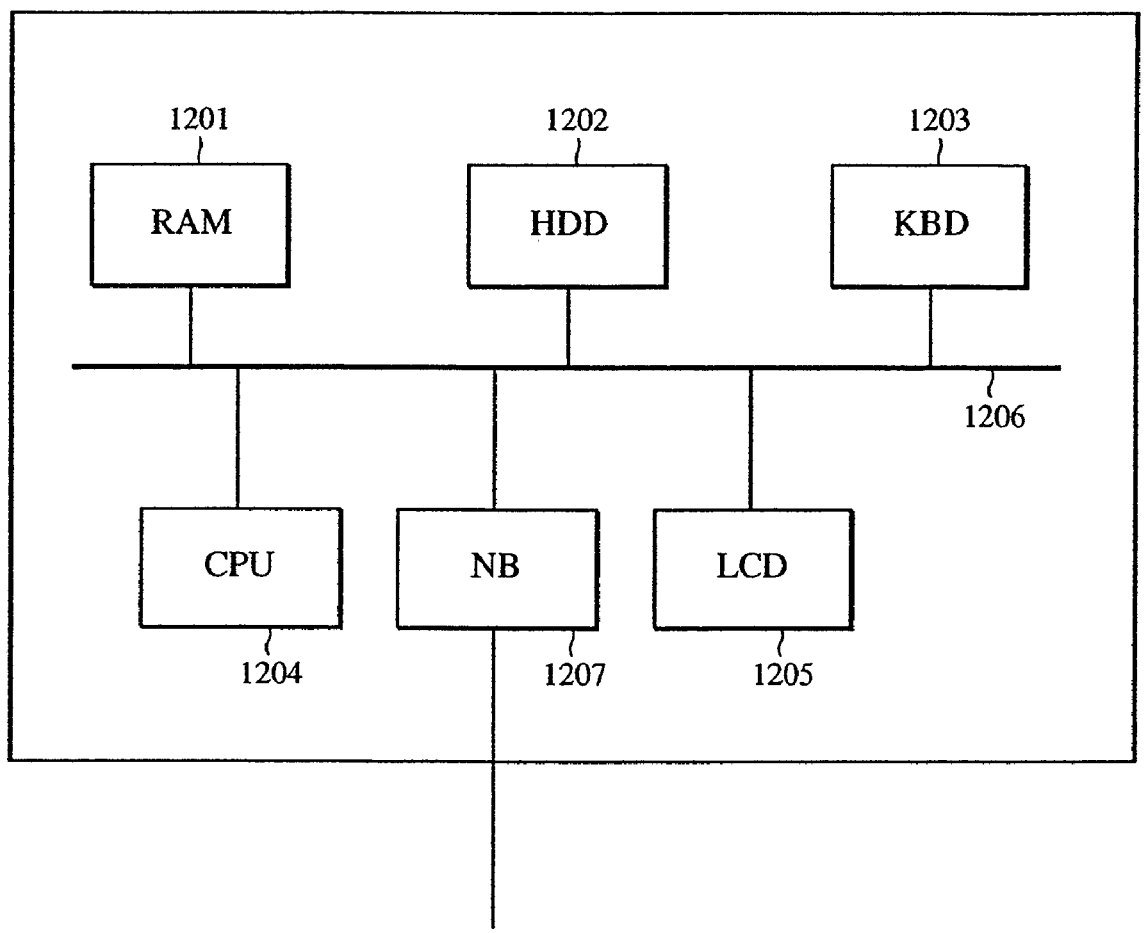
FIG. 12 illustrates hardware implementing the information processing apparatus, a peripheral device, and an alternate response apparatus according to the present invention.

FIG. 12 illustrates an example of a hardware configuration which is suitable for the information processing apparatus, the peripheral device, and the alternate response apparatus of the present invention. The client PC, which is a preferred example of the information processing apparatus, is formed by a standard PC. The client PC includes the hardware configuration shown in FIG. 12. The client PC includes, through a bus 1206, a Random Access Memory (RAM) 1201, a Hard Disk Drive (HDD) 1202 which is a storage unit, a keyboard (KBD) 1203 which is an example of an input unit, a Central Processing Unit (CPU) 1204 which is an example of a controller, a display (Liquid Crystal Display (LCD)) 1205 which is an example of a display unit, and a network board (NB) 1207 which is an example of a communication controller. The storage unit may include another type of storage medium, such as an HDD, a portable CD-ROM, or a built-in ROM.

The modules 1 to 8 shown in FIG. 1 are stored in the HDD 1202. If necessary, the modules 1 to 8 are read into the RAM 1202 and are executed by the CPU 1204. Accordingly, the CPU 1204 performs processing shown in FIG. 2 and implements the functions executed by the modules shown in FIG. 1.

Similarly, the printer shown in FIG. 1 has the hardware configuration shown in FIG. 12. The printer differs from the client PC in that the printer has a printer controller (not shown) for performing printing processing. The modules 9 to 15 shown in FIG. 1 are stored in an HDD or a ROM of the printer. If necessary, the modules 9 to 15 are read into a RAM and are executed by a CPU.

Figure 8:
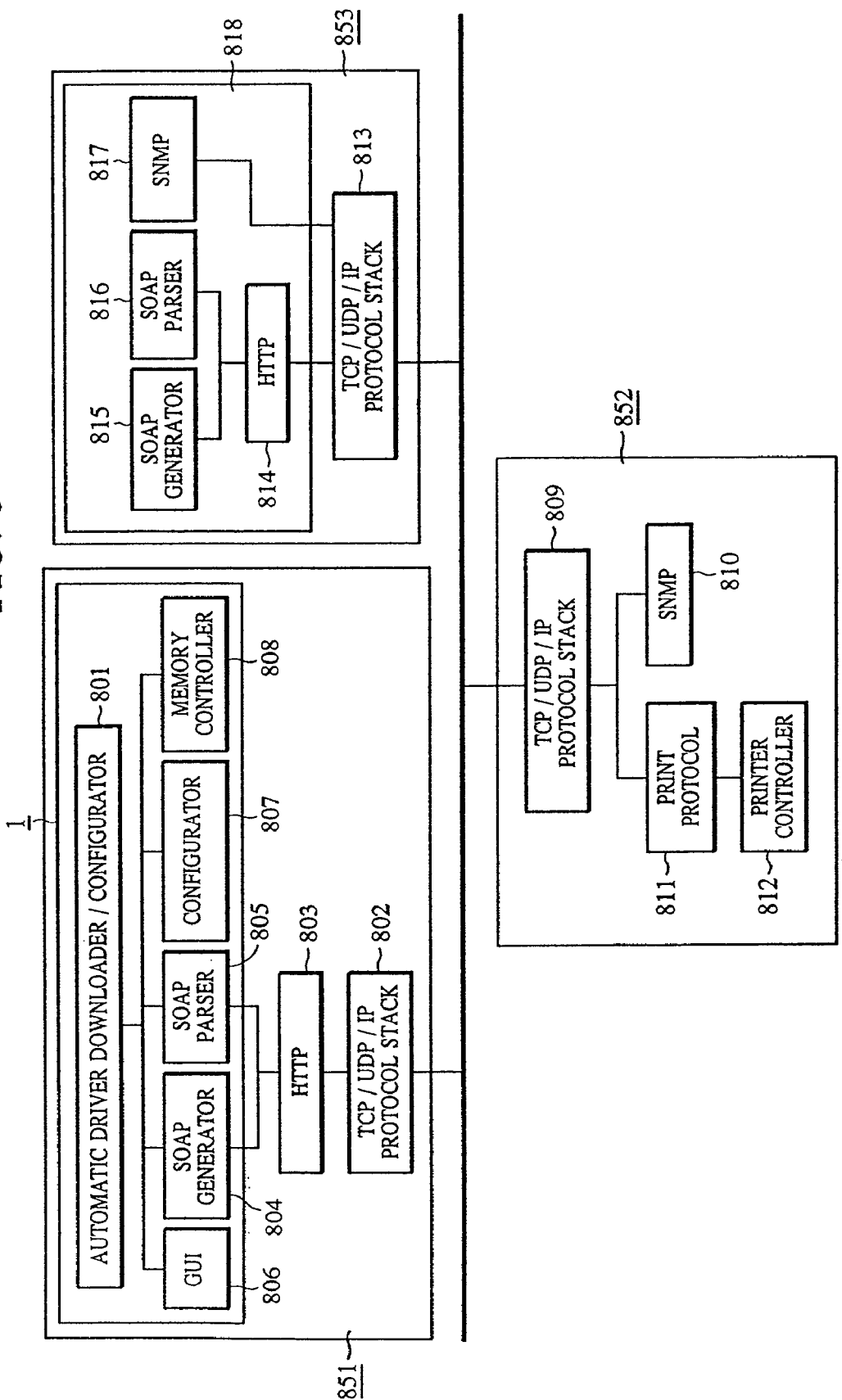
FIG. 8 illustrates the system configuration of an embodiment of a proxy server.

Referring to FIG. 8, a proxy server 853, which is a preferred example of the alternate response apparatus of the present invention, stores a SOAP generator 815, a SOAP parser 816, a Simple Network Management Protocol (SNMP) module 817, an HTTP module 814, and a TCP/UDP/IP protocol stack 813. Similarly, these modules are executed by the hardware shown in FIG. 12. A client PC 851 stores an automatic driver downloader/configurator 801, a TCP/UDP/IP protocol stack 802, a GUI module 806, a SOAP generator 804, a SOAP parser 805, a configurator 807, and an HTTP module 803. Similarly, these modules are executed by the hardware shown in FIG. 12. Basically, a memory controller 808 is often formed by independent hardware.

A printer PR 852 shown in FIG. 8 has the hardware configuration shown in FIG. 12. In a printer which is a preferred example of the peripheral device, the printer controller (not shown in FIG. 12) is connected to the bus 1206. The printer PR 852 includes a TCP/UDP/IP protocol stack 809, an SNMP module 810, and a print protocol module 811. Similarly, these modules are read from an HDD to a RAM and are executed by a CPU. A printer controller 812 can be implemented by an independent CPU. Unlike the printer shown in FIG. 1, the printer PR 852 shown in FIG. 8 includes no UPnP application.

Figure 2:
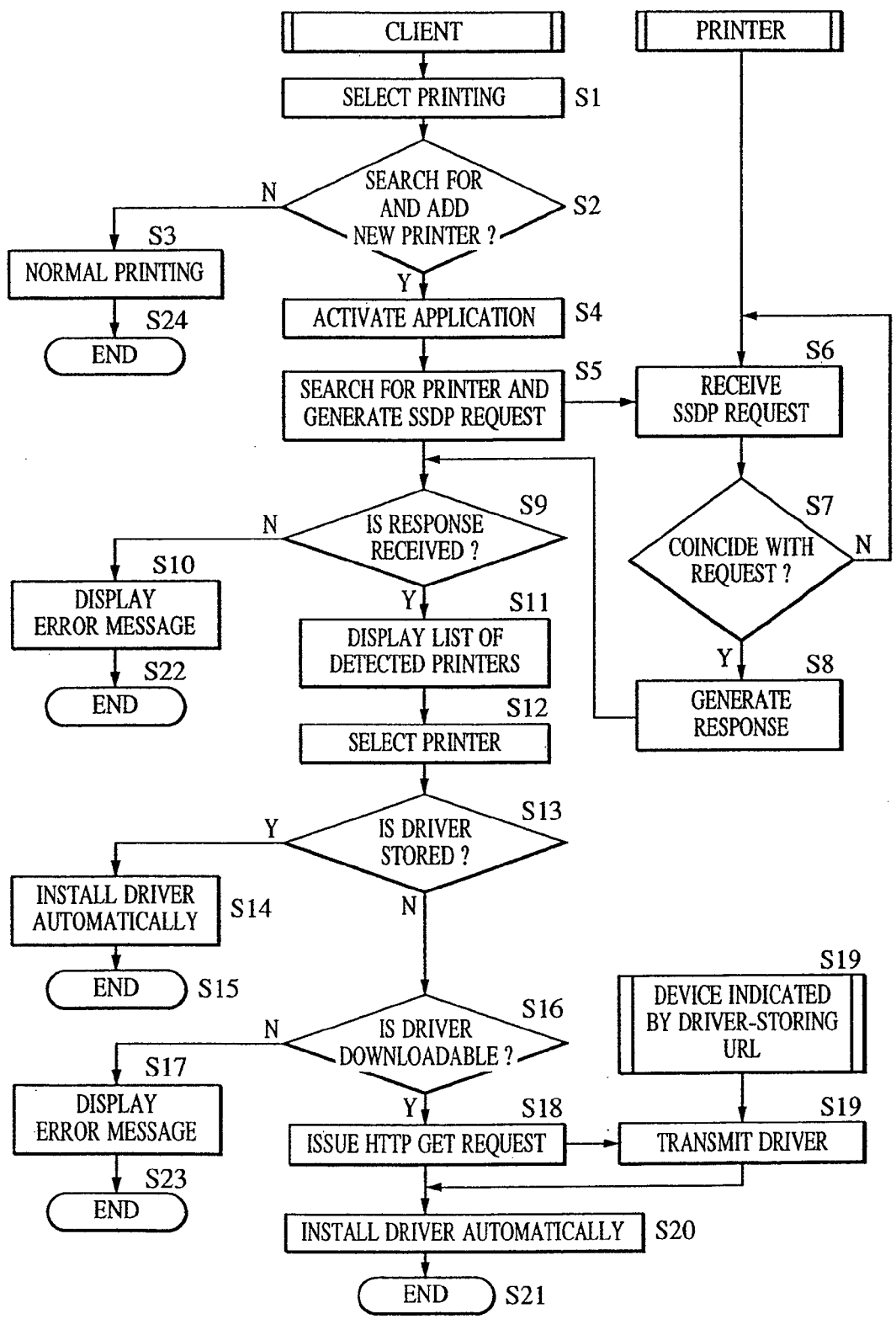
FIG. 2 is a flowchart of an example of a data processing process in the print system to which the information processing apparatus and a printer according to the present invention are applicable.

FIG. 2 is a flowchart showing an example of a data processing process in the print system to which the information processing apparatus and a printer according to the present invention are applicable. S1 to S24 represent steps.

FIG. 3 illustrates an example of a print setup window displayed on the client PC shown in FIG. 1. The print setup window corresponds to a state in which names of selectable printers and an item for searching for and adding a new printer are displayed on a printer selection box.

When printing a document created by an application (such as a word processor application) running on the client (such as a personal computer (client PC)) connected to the network, "Print" is selected from a menu (S1). In response, as shown in FIG. 3, a list of currently registered printers is displayed on the display of the client PC.

In step S2, it is determined whether or not to perform printing by the printer displayed on the list. If it is determined to perform printing by the printer displayed on the list, the user selects the printer by using a pointing device or by operating a cursor designation key. The created document is converted into printable data by a corresponding driver. The printable data is transmitted through the network to the designated printer, and normal printing processing is performed (S3).

In contrast, if it is determined in step S2 that the user wants to print data using a printer other than those registered on the list, that is, when using a new printer which is newly added to the network, or when using a printer available in a network environment at an office away from the network where the user usually is, the user selects the item for searching for and adding a new printer, which is shown in FIG. 3.

When the selection is done, the automatic driver downloader/configurator 100 in the application 1 of the present invention is activated (S4).

When the automatic driver downloader/configurator 100 is activated, the automatic driver downloader/configurator 100 included in the application 1 searches the network NET for an available printer (S5). In this embodiment, a protocol used in the searching is the Simple Service Discovery Protocol (SSDP) defined by the UPnP architecture 1.0, which is a preferred example of a predetermined search request. The automatic driver downloader/configurator 100 (issuing means) issues an HTTP packet in a format shown in FIG. 4 to a multicast address of 239.255.255.250 and a port number of 1900. The predetermined search request is not limited to the UPnP search request.

FIG. 4 shows an example of an HTTP request issued by the client PC shown in FIG. 1 to the printer PR.

In this embodiment, the Simple Object Access Protocol (SOAP) is used as an entity body of the HTTP request. When issuing the search packet, information about the OS used by the client PC is sent.

The format of the information about the OS is described in the Envelop tag in the format shown in FIG. 4. As parameters of a GetDriverInformation request (driver information obtaining request), SupportedOS and OSversion are sent.

SupportedOS is the name of the OS, which in this embodiment is, as shown in FIG. 4, Windows 98 (registered trademark). OSversion indicates the version of the supported OS, which in this embodiment, as shown in FIG. 4, is 4.10.2222A.

After the network printer PR to which the present invention is applied receives the above-described HTTP request (S6), the printer PR parses an ST (Service Type) header of the request and determines whether or not the HTTP request coincides with a request for the printer, that is, whether or not the header contents include Print (S7). When the determination is negative, that is, when the ST header designates a service other than Print, or when the packet contents are corrupt, the processing is interrupted. No response is issued in response to the request, the request is ignored, and the process returns to step S6.

If it is determined in step S7 that the header contents include Print, the HTTP request entity body is continuously parsed. The SOAP parser 11 parses a SOAP message of the HTTP request entity and checks the contents of SupportedOS and OSversion, which are parameters of the GetDriverInformation request. If the corresponding driver is not recorded in a recording unit of the network printer, no response is issued in response to the request. The request is ignored, and the process returns to step S6.

In contrast, when it is determined in step S7 that the corresponding driver is recorded, a response is issued and unicast to the client PC in accordance with a format shown in FIG. 5.

Figure 6:
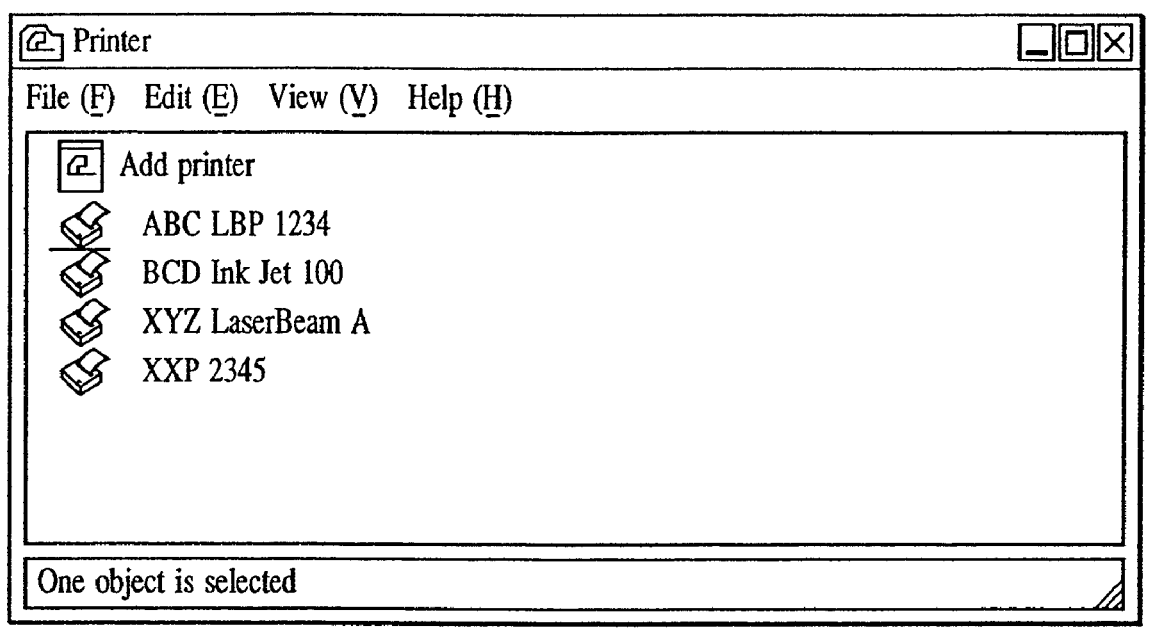
FIG. 6 illustrates an example of a window displayed on the client shown in FIG. 1, the window displaying a list of newly-detected printers.

In step S11, a predetermined service connected to the network can be displayed. In the ST header issued by the host (S5), a service including a plurality of printers can be designated. Instead of selecting a printer service in S2, it is possible to select a specific service, such as a scanning service, a digital camera service, a printing service, etc. in S2. For example, when the printing service is selected on the display screen of the host, a UPnP-based search request in which the printing service is included in the ST header is transmitted to the printer. The SOAP parser 11 of the printer recognizes the request. In accordance with the recognition that the printing service is designated in the ST header, the printer returns the device ID. The host extracts the device ID of each device capable of offering the printing service and displays devices capable of offering the printing service, as shown in FIG. 6. The application 1 can designate a plurality of printers which have sent responses to the request and which are thus detected as capable of offering the printing service and performs the installation as described above in accordance with the user's requests.

In this embodiment, the Simple Object Access Protocol (SOAP) is used as an entity body of the HTTP response, and the following information concerning the driver recorded in the recording unit in the printer is sent to the client. The automatic driver downloader/configurator 100 (obtaining means) obtains the information through the TCP/UDP/IP protocol stack 2.

The information is described in the Envelope tag as device configuration information shown in FIG. 5. As a return value for the GetDriverInformation request from the client PC to the printer PR, the following is sent to the client PC. The SOAP parser 5 (obtaining means) obtains the device configuration information through the TCP/UDP/IP protocol stack 2.

FIG. 5 shows an example of an HTTP response sent from the printer PR to the client PC shown in FIG. 1.

The device configuration information shown in FIG. 5 is added to a predetermined region of a response to the driver information obtaining request by the SOAP generator 12 of the printer. In other words, the SOAP generator 12 adds the device configuration information to a region, which is in the Envelope tag, for describing the return value for the GetDriverInformation request. The HTTP 10 controls the TCP/UDP/IP protocol stack 9 to transmit the device configuration information to the client PC and performs response processing. As shown in FIG. 5, the SOAP generator 12 adds, as the device configuration information, information indicating an URL of a storage region for storing the printer driver for the printer, printer manufacturer name, model name, and printer's capabilities to an extended region of the original response according to UPnP 1.0. For example, PrinterMakeAndModel indicates the printer manufacturer name and model name. PrinterName indicates the name of the printer. PrinterPDL indicates a page description language supported by the printer. PrinterLocation indicates a printer installed location. IPAddress indicates a printer IP address. DriverVersion indicates a driver version. DriverDataSize indicates a driver data size. DriverRequiredMemorySize indicates the memory size required by the driver. DriverURL indicates the URL at which the driver is stored.

In place of DriverURL, information indicating the storage region for storing the printer driver can be obtained by designating a Microsoft's UNC (Universal Naming Convention) path name and by obtaining the driver from a predetermined storage region of a storage device of a server on the network. The device configuration information is parsed by the SOAP parser 5 (recognition means). The SOAP parser 5 extracts, from the device configuration information, a device ID, which is a preferred example of printer identification information, and recognizes the device ID. The device ID can be anything as long as it can be used to uniquely distinguish the printer from the other printers. In the following description, an example will be described in which, of the device configuration information shown in FIG. 5, a combination of the printer manufacturer name and the model name is used as the device ID to specify the printer.

Hereinafter, information exchanged between devices connected to the network such as UPnP when the devices negotiate over the network is referred to as device configuration information. Identification information which is extracted by the application 1 from the device configuration information and which can specify the printer is referred to as a device ID. In this embodiment, a combination of the model and printer manufacturer name is used as the device ID. In an interface (such as USB and IEEE 1284) used for local connection, the device ID is managed by associating the device ID with a specific number.

In step S9, it is determined whether or not the response is received within a predetermined period of time. If the determination is negative, an error message is sent through the GUI module 6 to the user by displaying the error message on the display of the client PC (S10). Subsequently, the processing is terminated (S22).

In contrast, if it is determined in step S9 that the response is received within the predetermined period of time, in accordance with the response result, the application 1 of the client PC which has received the response controls the GUI module 6 and displays a list of names of network printers which have sent responses including the device configuration information, which will be described below, on the display of the client PC (S11), as shown in FIG. 6.

FIG. 6 illustrates an example of a window displayed on the display of the client PC, the window displaying a list of newly-detected printers.

When the user selects and designates a desired printer name on the list, the designation is input to the application 1 (designation means) through the GUI module 6. In response to the printer designation input, the application 1 converts the device ID in the following manner. The application 1 (determination means) searches a driver database managed by the client OS for a corresponding driver and determines whether or not the corresponding driver is stored in the recording unit (e.g., hard disk) of the client PC (S13). If it is determined that the driver is stored in the recording unit of the client PC, the application 1 (installation controlling means) installs the driver (S14). The application 1 sets the printer IP address obtained from the printer to the driver, extracts, from the device configuration information, a device number which is recognizable by the PnP installer, recognizes the device number, inputs the device number to the PnP installer, and controls the PnP installer to start the installation. The PnP installer which has received the device number calls an API (Application Program Interface) for the OS, starts installing the driver into a system installer, and completes the driver installation (S15).

Using the device ID, the application 1 controls the PnP installer, which is an installer of the present invention and which complies with IEEE 1284-2000, to perform installation. Although IEEE 1284-2000 is used here, any communication interface can be used as long as a device number for specifying a connected device can be exchanged.

As is typified by Microsoft's Windows (registered trademark), the following mechanism for utilizing a PnP-related API for causing the client OS to perform driver installation will now be described.

For example, a USB-compliant PnP installer, which is a preferred example of an installer, can be operated. Hereinafter, PnP installation in steps S13 to S15 using a USB device number will now be described in detail. When using the USB device number, the device number is generated in a predetermined format from the device ID which is the combination of the manufacturer name and the model name. The application 1 can extract the device ID from the device configuration information shown in FIG. 5. The device number is expressed using hexadecimal notation in the predetermined format defined by USB in the following manner.

For example, of a plurality of manufacturers, the manufacturer Kaisha Inc is associated with the number 04a9. Printer 330 is associated with the number 1051, which is one of numbers below the hierarchy of the number 04a9. The application 1 inputs device numbers, i.e., a combination of the number 04a9 and the number 1051, to the PnP installer and causes the PnP installer to perform the installation described below.

In the above-described case, the driver installation is performed in steps S13 to S15 by the PnP installer and the system installer. In an OS not supplied with the PnP function, the application 1 performs the entire installation process.

Figure 10:
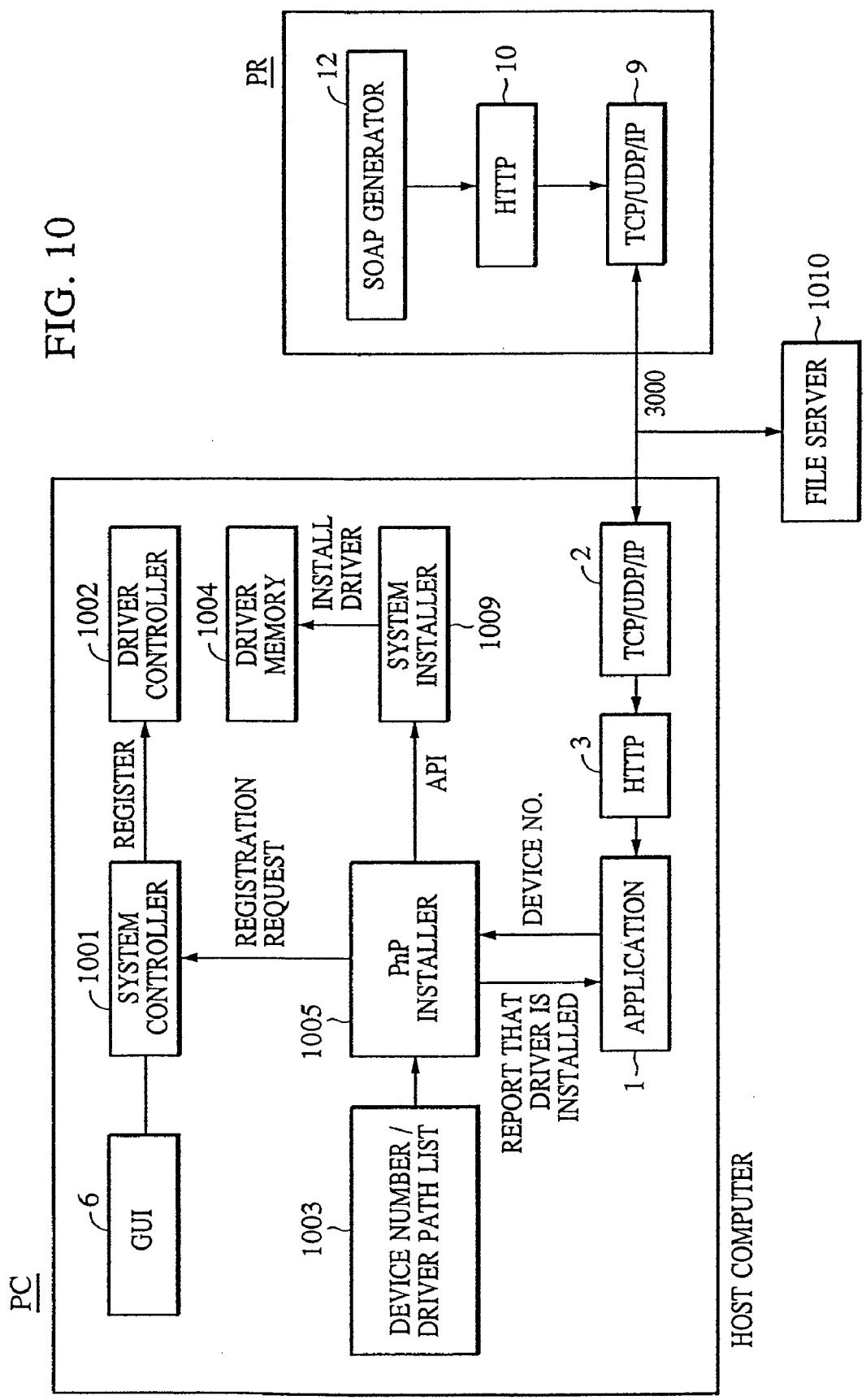
FIG. 10 illustrates a system for installing a control program.

FIG. 10 is a block diagram of the software configuration of a host computer (PC) according to this embodiment of the present invention. Basically, the host computer (PC) is similar to the host computer PC shown in FIG. 1. An application 1 shown in FIG. 10 is similar to the application 1 shown in FIG. 1. Referring to FIG. 10, quadrangular blocks 1, 2, 3, 6, 1001, 1002, 1003, 1004, 1005, and 1009 are formed by program modules. These program modules are stored in an external memory in the host computer and, if necessary, these program modules are read into a RAM and are controlled by a CPU. A device number is information for identifying a peripheral device (e.g., a printer PR). The device number/driver path list 1003 stores combinations of a device number and a driver path. The driver path is a storage location (path) for storing a device driver (which in this case is a printer driver) in the external memory of the host computer or in an external memory of a file server 1010 connected to the host computer through a network 3000. The PnP installer 1005 searches for the driver path in accordance with the device number as the key, recognizes the driver path, and obtains the printer driver from the driver path. The PnP installer 1005 controls the OS to install the obtained printer driver.

Figure 13:
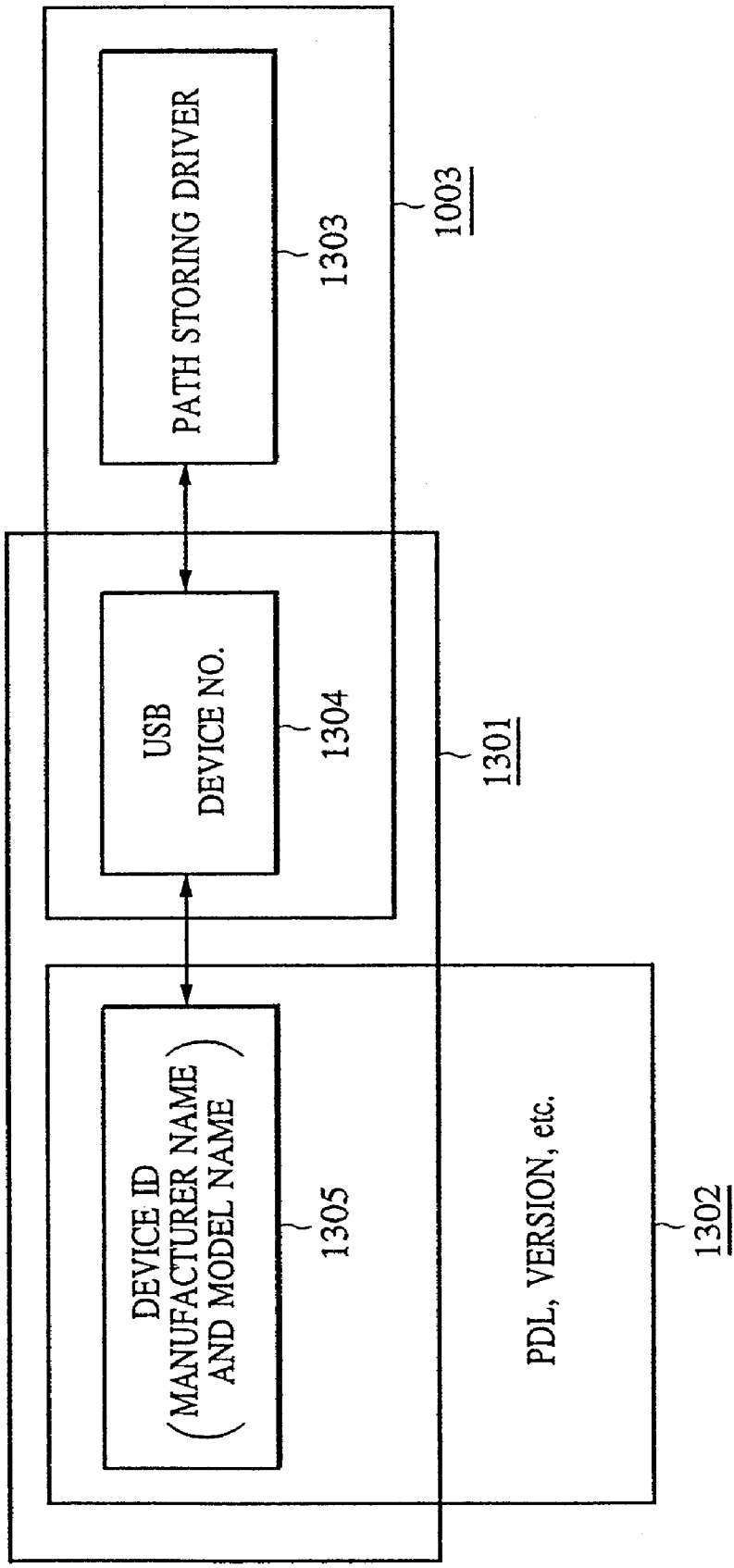
FIG. 13 illustrates a table for storing a device ID, a USB device number, and a path for storing a driver.

FIG. 13 shows a table for storing a device ID, a USB device number, and a path for storing a driver. Specifically, a table 1301 in the application 1 associates a device ID 1305, which is a combination of manufacturer name and model name and which is part of the device configuration information, with a USB device number 1304. The device number/driver path list 1003 associates the USB device number 1304 with a path 1303 for storing the driver. The installation will now be described in detail using the PnP installer 1005 which complies with PnP.

The printer (PR) transmits the printer configuration information shown in FIG. 5 to the client PC. The client PC receives the printer configuration information from the printer PR and stores the printer configuration information in an HDD or the like of the client PC. From the printer configuration information stored in the HDD, the application 1 (obtaining means) extracts and obtains a printer (device) ID, which is the basis for the device configuration information shown in FIG. 5. The printer (device) ID is expressed as:

<PrinterMakeAndModel>ABC Printer Series 123</PrinterMakeAndModel>

From string processing, the application 1 recognizes that the manufacturer is ABC and the model is Printer Series 123. The application 1 has the table 1301 for associating the device ID 1305, which is the combination of the printer manufacturer and the printer model name, with the device number 1304 which can be associated with the device ID 1305. The application 1 (conversion means) converts the obtained device ID 1305 into the device number 1304 (which in the above case is a combination of 04a9 and 1051) which is recognizable by the USB-compliant PnP installer 1005 (installation means).

The PnP installer 1005 obtains the device number 1304, which is converted by the application 1, from the application 1. The PnP installer 1005 searches the device number/driver path list 1003 for the path 1303 which corresponds to the device number 1304 and which stores the printer driver, and specifies the path 1303.

The PnP installer 1005 (installation means) calls the system installer 1009 from the API for the OS. The system installer 1009 obtains the printer driver stored in the external memory of the file server 1010 or the external memory of the client PC and installs the printer driver in the driver memory 1004. At the same time, the system installer 1009 automatically requests the driver controller 1002 to register the printer based on the device304. From this point onward, the OS recognizes that the driver is registered. Thus, the printer driver stored in the driver memory 1004 is appropriately loaded, and various printing-related processing is performed. In this embodiment, USB is used as an example of a method for transmitting/receiving identification information of the device. Alternatively, another interface, such as IEEE 1284-2000, corresponding to a device number can be used. Accordingly, the existing PnP installer 1005 can be utilized by utilizing information managed by the UPnP management method and without adding many changes to the system.

When an interface based on IEEE 1284-2000 is used, the following operation is performed. The application 1 (conversion means) extracts device configuration information which can be used in accordance with IEEE 1284-2000 from device configuration information (including PrinterMakeAndModel indicating the printer manufacturer name and the printer model name, PrinterName indicating the printer name, and PrinterPDL indicating the printer description language) included in the HTTP response sent from the printer PR. According to IEEE 1284-2000, the following printer configuration information can be input to the IEEE 1284-2000 interface:

MANUFACTURER (device manufacturer): ABC;
COMMAND SET (supported command/language): LIPS;
MODEL (printer model): Printer Series 123;
COMMENT (comment): Located in Room 33; and
ACTIVE COMMAND SET (active command/language): LIPS.

From the above device configuration information, the application 1 extracts a combination of MANUFACTURER value and MODEL value as a device ID. The application 1 converts the device ID into a device number which is recognizable by an installer compliant with IEEE 1284-2000 and inputs the device number to the PnP installer. The application 1 sends the device number and IP address to an install module which performs PnP processing relative to the OS through the API. The PnP installer in compliance with IEEE 1284-2000 uses the device number from the above configuration information and installs the driver.

For IEEE 1394, the application 1 similarly generates a device ID from a combination of a manufacturer name and a model name and converts the device ID into a device number in the IEEE 1394 format. The PnP installer recognizes a driver path and performs processing. Although the device number has been used in the above description, any type of information can be used as long as it can be used to identify a device. For example, instead of using the device number, alphabetical characters or an address which can be assigned to each device can be used.

An example in which the client PC receives the device configuration information including the device ID from the printer and the application 1 in the client PC performs conversion processing has been described. Alternatively, the peripheral device can have a table similar to the table 1301 in the application 1, so that the peripheral device can issue a USB device number in accordance with a device ID which is a combination of a manufacturer name and a model name. The client PC receives the USB device number as it is, and hence the PnP installer is not required to perform conversion processing and performs installation using the USB device number.

In contrast, in step S13, when the application 1 (determination means) determines that the driver is not stored in the recording unit in the client PC, the application 1 checks the memory size required by the driver, which is obtained beforehand from the printer, with the free space in the recording unit in the client PC, which is designated by the user, and determines whether or not the driver is downloadable (S16). If it is determined that the memory size is not sufficient (that is, if it is determined that the driver is not downloadable), an error message is displayed on the display of the client PC to inform the user of the error (S17), and the processing is terminated (S23).

In contrast, if it is determined in step S16 that the memory size is sufficient (that is, if it is determined that the driver is downloadable), the client PC issues an HTTP GET request to the driver-storing URL (S18), and the application 1 (control program obtaining means) downloads the driver recorded in the recording unit of the network printer (S19). The driver-storing URL can be a URL to the printer or a URL to a different external server.

When the driver downloading is completed, the driver in the recording unit of the client PC decompresses itself, and self-installation processing (automatic installation processing) is executed (S20). The application 1 sets the printer IP address obtained from the printer to the driver, and the driver installation is completed (S21).

When the foregoing processing is completed, the registration of the new printer in the client system is completed. Accordingly, the new printer can be used from the application 1.

As described above, according to the foregoing embodiment, when the corresponding printer driver is unavailable, that is, when the printer driver does not exist in the database managed by the OS, or when the user does not have an external recording medium supplied with the driver, the appropriate device driver corresponding to the peripheral device can be obtained externally. When the user is in a different network environment, the user can still use the printer.

Each peripheral device and the host computer performs negotiations using the device configuration information. When the user (client) moves from an office in building A to an office in building B and is in a different network environment, the user has to print a user's document in the new network environment. Even in such a case, the user is not required to install a driver for a printer on the new network and to perform setup of network information.

In accordance with a selected specific service, a display displays information about registered peripheral device(s) capable of executing the specific service and an item for searching for and adding a new available peripheral device. When the item is selected, a search request for searching for an available peripheral device(s) on the network is issued. In response to the issued search request, the available peripheral device(s) returns device configuration information, and the device configuration information is obtained. A list of the detected peripheral device(s) is displayed on the display. Even when the network connection environment of the information processing apparatus physically changes, a peripheral device candidate(s), other than the registered peripheral devices, which is connected to the network can be easily detected by simply making the selection of a peripheral device(s) from the application.

When a list of detected peripheral devices is displayed on the display, a peripheral device for receiving a specific service is selected from the list. It is determined whether or not driver software for operating the selected peripheral device is registered. If it is determined that the driver software for the peripheral device is registered, network setup based on the device configuration information is added to the registered driver software, and hence the peripheral device becomes operable. If it is determined that the driver software for the peripheral device is not registered, the driver software to be stored in the selected peripheral device is obtained from a driver downloading location based on the device configuration information. Network setup is added to the obtained driver software, and hence the peripheral device becomes operable. Even when the network environment of the information processing apparatus physically changes, a burdensome driver installation and setup operation for activating a newly-connected peripheral device is automated. Thus, the burden on the user to perform network connection processing is greatly lessened. In the new network environment, a peripheral device can be freely selected, and a desired service can be normally operated.

When it is determined that the device search criteria issued by the information processing apparatus coincides with the predetermined service request, the device configuration information in the network environment is returned to the information processing apparatus. When the network environment specification changes, such as when a new information processing apparatus is connected to the network, the device configuration information required for normally and appropriately activating the peripheral device in response to a request from the information processing apparatus can be provided to the information processing apparatus. The burden on the user to perform network setup processing is greatly reduced.

In the foregoing embodiment, the network service, which in this embodiment is the network printer, includes the SOAP processors, and the printer parses the GetDriverInformation request (driver information obtaining request) issued by the client and directly returns, as a response, the printer (device) configuration information including the printer identification information including the device ID to the client. Alternatively, the present invention can be implemented by providing a proxy server. The proxy server includes modules corresponding to the printer PR shown in FIG. 1. Primarily, portions differing from the previous case will now be described.

In this case, referring to FIG. 8, the proxy server 853, which is a preferred example of the alternate response apparatus of the present invention, includes the TCP/UDP/IP protocol stack 813 as a communication function and, thereabove, the HTTP module 814, which complies with HTTP 1.1, for parsing an HTTP request and issuing a response. The client PC 851 is a computer similar to the client PC shown in FIG. 1.

In this embodiment, the Simple Object Access Protocol (SOAP) is used in an entity body of an HTTP request from the client 851. The processing modules, namely, the SOAP generator 815 and the SOAP parser 816, are implemented above HTTP 1.1. The proxy server 853 further includes the SNMP control module 817 for searching for a network printer on the network and for obtaining device configuration information. When a plurality of printers is connected to the proxy server 853, the SNMP module 817 (recognition means) in the proxy server 853 uses the SNMP to obtain and recognize device information (which is generated by simply converting the device configuration information into SNMP data format) from the plurality of printers. When the SOAP parser 816 obtains, through the TCP/UDP/IP protocol stack 813, a request from the client PC 851 to search for specific printers of the plurality of printers, the SOAP parser 816 (extraction means) extracts device IDs of the specific printers from the previously-obtained device configuration information for the plurality of printers. The SOAP generator 815 (adding means) generates the device IDs from the device information which is obtained using the SNMP. As in the response by the printer PR described above, the application 818 (responding means) adds the device IDs to a predetermined region of a response to the driver information obtaining request, that is, a region, which is in the Envelope tag, for describing a return value for a GetDriverInformation request. Thus, the TCP/UDP/IP protocol stack 813 is controlled to return the response.

In contrast, the network printer 852, which is a preferred example of the peripheral device, similarly includes the TCP/UDP/IP protocol stack 809 as a communication function, the print protocol module 811, and the printer controller module 812. In the network printer 852, the SNMP module 810, which is an SNMP control module, is implemented above the TCP/UDP/IP protocol stack 809. The SNMP module 810 parses a request issued by the proxy server 853 of the present invention and issues a response.

After the proxy server 853 is activated, the proxy server 853 broadcasts a Get request from the SNMP module 810 to the following MIB (Management Information Base) object(s) in accordance with a predetermined interval, thus obtaining device configuration information on the network. The SNMP is a protocol for setting and managing peripheral devices. MIB is defined by RFC 1213, 1759, and so on, and is a database format for maintaining and managing items which can be managed by the SNMP.

The network printer 852 in which the SNMP is implemented generates information corresponding to each object in response to the request and unicasts the information as an SNMP response to the proxy server 853.

The proxy server 853 contains a list of information items required for generating identification information of peripheral devices in UPnP. For example, the items include printer manufacturer name, model name (product name), printer name, printer installed location, IP address, supported page description language, and supported print protocol. Necessary information is extracted from the MIB information included in the SNMP response in accordance with the list of information items required for generating the identification information of peripheral devices in UPnP, and the necessary information is converted into XML (eXtensible Markup Language) format, which is suitable for UPnP. More specifically, the following data are extracted:

PrinterMakeAndModel: printer vendor/product name
PrinterName: printer name
PrinterLocation: printer installed location
IPAddress: printer IP address
PrinterPDL: supported page description language
SupportedPrintProtocol: supported print protocol The extracted MIB information in accordance with the SNMP is converted into XML format, as shown in FIG. 9, by the application 818. The converted information is transmitted to the external client PC 801.

Subsequently, in response to a request from the client PC 851, the proxy server 853 which has received a response from each network printer 852 performs the same processing as the printer PR shown in FIG. 1 in the foregoing embodiment. Specifically, the proxy server 853 performs steps S6 to S8 shown in FIG. 2. More specifically, in response to a response from the client 851, a server module in the proxy server 853 controls a transmission module, which is part of the OS of the proxy server 853, to transmit the device configuration information (including printer manufacturer name, printer model name, and language name) shown in FIG. 5, which is stored in the proxy server 853, to the client 851. As shown in FIG. 9, the response sent to the client PC 851 from the proxy server 853 is generated by expressing in XML the device configuration information and identification information of all the detected printers as MIB objects using the SNMP, converting the information into a schema shown in FIG. 5, and batch-transmitting the schema to the client PC 851, which is a preferred example of the information processing apparatus, using the HTTP.

Accordingly, for example, by using the HTTP-compliant well-known port, which is port 80, even when the port to be used by the SNMP is not permitted by a firewall, a legacy printer which is only in compliance with the SNMP can be detected across the firewall using HTTP.

Figure 11:
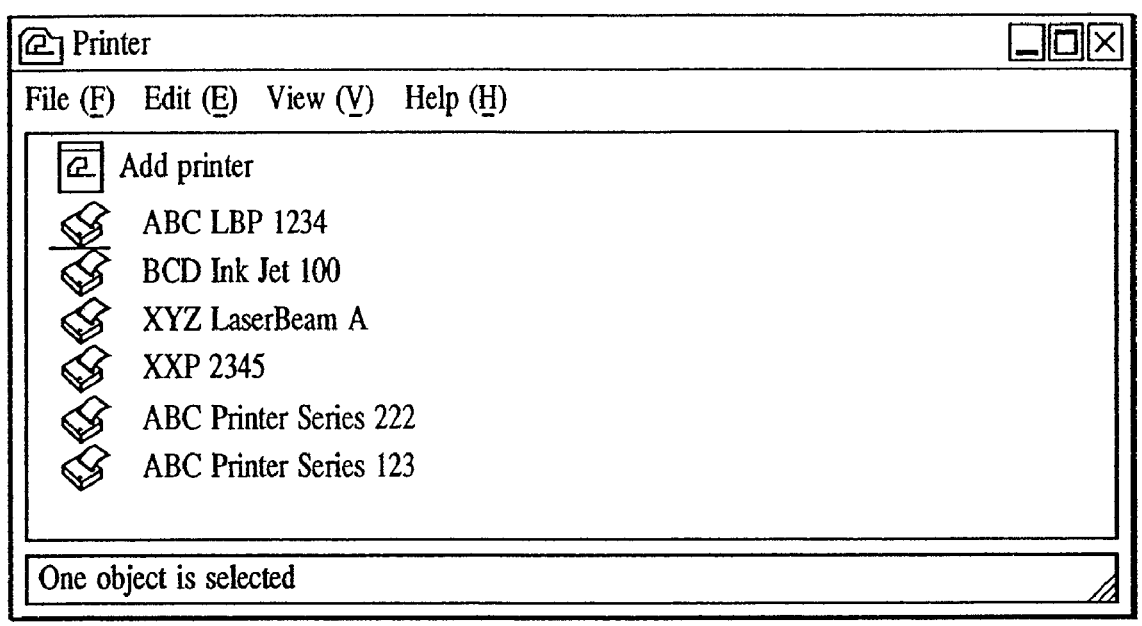
FIG. 11 illustrates the result of recognition of non-UPnP peripheral devices in a UPnP management system.

As in the foregoing case, the client PC 851 which has received the response displays a list of printer names, which are described in the response from the proxy server 853, on the display of the client PC 851, as shown in FIG. 11. Referring to FIG. 11, legacy printers which comply with the SNMP but not with the UPnP, namely, ABC Printer Series 123 and ABC Printer Series 222, which are extracted from information included in the identification information by the application 818 in the proxy server 853 shown in FIG. 8, and new-type UPnP-compliant printers are displayed on the same window and are browsable by UPnP management software. This is a previously unaccomplished achievement.

The client 851 which has received the response generates a device ID using the application 1 in the client 851. The application 1 converts the generated device ID into a device number format which is recognizable by the PnP installer. The PnP installer can perform installation in accordance with the device number. Even when a printer complies with an old device management method (such as the existing SNMP) but not with a method for obtaining printer (device) configuration information through the network (such as the UPnP), the proxy server 853 acts as an intermediary between the printer and the client PC 851. Thus, the client PC 851 can manage the printer in accordance with the device-configuration-information obtaining method through the network by obtaining, through the proxy server 853, model name, printer manufacturer name, and the like.

In the foregoing embodiments, the printer is regarded as the image processing apparatus. Also, the image processing apparatus includes a scanner, a facsimile machine, a copy machine, and a multifunctional image processing machine combining these functions. The present invention can be implemented by any type of image processing apparatus as long as software for controlling the image processing apparatus can be supplied through the network.

In the foregoing embodiment, the protocol formulated by the SSDP is employed when searching for a printer. The present invention can be implemented by any type of search protocol, such as the SLP (Service Location Protocol), as long as the protocol employs the OS name and OS version as the search criteria, which is a feature of the foregoing embodiments.

Although the HTTP entity is expressed using the SOAP in the foregoing embodiments, the HTTP entity can be expressed using a unique schema.

In the foregoing embodiments, the driver is recorded in the recording unit of the network printer. The driver-storing URL, which is a preferred example of the storage region for storing the device driver, is set as the URL to the recording unit of the network printer. Alternatively, the present invention can be implemented when DriverURL indicates a URL to a driver stored in the file server 1010 on the network.

With reference to a memory map shown in FIG. 7, the structure of data processing programs which are readable by the network system, to which the information processing apparatus and the printer according to the present invention are applicable, will now be described.

FIG. 7 illustrates a memory map of a storage medium for storing various data processing programs which are readable by the network system to which the information processing apparatus and the printer according to the present invention are applicable.

Although not shown in FIG. 7, information for managing a group of programs stored in the storage medium, such as version information, creator, etc. may be stored. In addition, information dependent on an OS of the program reading apparatus, such as icons for distinguishingly displaying the programs, may be stored.

Data subordinate to the various programs are managed in the same directory as a directory for storing the foregoing information. Also, programs for installing the various programs into a computer and, when the programs to be installed are compressed, programs for decompressing the compressed programs may be stored.

The functions shown in FIG. 2 in the embodiments can be performed by the host computer using a program which is installed externally. In this case, the present invention can be implemented by supplying a group of information including the program, which is provided through a storage medium, such as a CD-ROM, a flash memory, or a floppy disk, or provided through an external storage medium through the network, to an output device.

As described above, a storage medium having recorded therein software program codes for implementing the functions of the foregoing embodiments is supplied to a system or an apparatus, and a computer (e.g., CPU or MPU) in the system or the apparatus reads and executes the program codes stored in the storage medium. Accordingly, the objects of the present invention can be achieved.

In this case, the program codes read from the storage medium realize the new functions of the present invention, and the storage medium storing the program codes constitutes the present invention.

As the storage medium for supplying the program codes, for example, a floppy disk, a hard disk, an optical disk, a magneto-optical disk, a CD-ROM, a CD-R, a magnetic tape, a non-volatile memory card, a ROM, and a EEPROM can be used.

Furthermore, besides a case where the aforesaid functions according to the above embodiments are realized by executing the program codes which are read by the computer, the present invention includes a case where an OS running on the computer performs part or the entire process in accordance with designations of the program codes and realizes functions according to the above embodiments.

Furthermore, the present invention also includes a case where, after the program codes read from the storage medium are written in a memory of a function expansion board which is inserted into the computer or a function expansion unit which is connected to the computer, a CPU in the function expansion board or the function expansion unit performs part or the entire process in accordance with designations of the program codes and realizes the functions of the above embodiments.

According to the foregoing embodiments, when using a network device, it is necessary to install driver software for controlling the device. In the driver installation, a user can make the device available without being aware of information required to perform setup.

Also, it becomes unnecessary to record in advance the driver software for controlling the network device in a recording unit in a client device. Also, the user is not required to carry an external recording medium having recorded therein the driver software.

When the client wants to use a network device, the client can detect a new network device on the network over which a job request is sent.

Since identification information of a peripheral device is added to a predetermined expanded region of a response in response to a search request in accordance with the peripheral device's existing network management protocol (e.g., UPnP), a mechanism for exchanging the identification information of the peripheral device can be provided without adding great changes to the existing peripheral-device management system. Furthermore, the peripheral-device information can be utilized for implementing PnP.

Combinations of the components illustrated in the foregoing embodiments can be appropriately created within the scope of the present invention.

As described above, according to the present invention, information for managing a peripheral device on the network can be easily detected and utilized.

Also, a PnP installer in a computer into which a driver is to be installed can recognize a peripheral device on the network and install a corresponding driver. By simply connecting the peripheral device to the network, the total driver installation into a client PC can be performed without performing complicated operations.

Also, a proxy server for managing identification information of a peripheral device is provided. Even when a plurality of methods for managing peripheral devices on the network concurrently exists, a management system in compliance with a specific management method can recognize a peripheral device which is on the network and which is not in compliance with the specific management method.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing method for an information processing apparatus which communicates with a peripheral device via a network and which includes an installer for a control program for controlling the peripheral device, the information processing method comprising:
   an obtaining step of obtaining a message from the peripheral device, wherein the message is in compliance with a predetermined network discovery protocol and is described in a markup language;
   a parse step of parsing the obtained message for interpreting contents of the obtained message;
   a first extracting step of extracting first identification information including manufacturer information and model information of the peripheral device from the obtained message which is in compliance with the predetermined network discovery protocol according to the parsing;
   a second extracting step of extracting a network address of the peripheral device from the obtained message which is in compliance with the predetermined network discovery protocol according to the parsing;
   a generating step of generating second identification information which indicates a manufacturer and a model of the peripheral device by using the extracted first identification information of the peripheral device extracted from the message which is in compliance with the predetermined network discovery protocol, wherein the second identification information is information suitable for controlling the installation by said installer;
   an inputting step of inputting the generated second identification information to the installer;
   an installation controlling step of controlling the installer to start installation of the control program into the information processing apparatus by using the second identification information input in said inputting step; and
   a setting step of setting the network address of the peripheral device extracted in the second extracting step from the obtained message which is in compliance with the predetermined network discovery protocol to the control program installed by the installer.

2. The information processing method according to claim 1, further comprising a designation step of designating the peripheral device to be controlled by the control program in accordance with the message obtained in said obtaining step in response to a search request previously issued by the information processing apparatus, wherein, in said installation controlling step, the installer is controlled to start the installation of the control program for controlling the peripheral device in response to the designation input in said designation step.

3. The information processing method according to claim 2, wherein, in said designation step, a peripheral device which provides a specific service is designated.

4. The information processing method according to claim 1, further comprising:

a display controlling step of displaying a service on a display of the information processing apparatus, and an issuing step of issuing a search request for searching for available peripheral devices on the network when an item, which is displayed on the display, for designating a search and addition is input, wherein, in said display controlling step, a list of peripheral devices is displayed on the display of the information processing apparatus in accordance with a plurality of messages obtained in said obtaining step in response to the search request, and in said installation control step, in response to the selection of a peripheral device from the list of peripheral devices displayed in said display controlling step, the installer is controlled to start the installation of the control program for controlling the selected peripheral device.

5. The information processing method according to claim 1, wherein, in said installation controlling step, using information indicating a storage region for storing the control program, the information being included in the obtained message, the control program is obtained from the storage region.

6. The information processing method according to claim 1, further comprising:

a determination step of determining whether or not the control program for controlling the peripheral device is stored in the information processing apparatus, wherein, when it is determined in said determination step that the control program is stored in the information processing apparatus, in said installation controlling step, the control program stored in the information processing apparatus is obtained and the installer is controlled to start the installation of the obtained control program, and when it is determined in said determination step that the control program is not stored in the information processing apparatus, the control program is obtained using URL information or an UNC (Universal Naming Convention) path name which indicates a storage region for storing the control program, the URL information or the UNC path name being included in the message and the installer is controlled to start the installation of the obtained control program.

7. The information processing method according to claim 1, wherein, in said installation controlling step, when the second identification information of the peripheral device is input to the installer, using the input second identification information, the installer is controlled to call an application program interface of an operating system.

8. The information processing method according to claim 1, wherein the information processing apparatus can use a plurality of network discovery protocols, and in said first extracting step, even if the message obtained in said obtaining step is in compliance with any of the plurality of network discovery protocols, the first identification information including the manufacturer information and the model information of the peripheral device is extracted from the obtained message.

9. An information processing apparatus which communicates with a peripheral device via a network and which includes an installer for a control program for controlling the peripheral device, the information processing apparatus comprising:

a processor and a memory;

an obtaining unit that obtains a message from the peripheral device, wherein the message is in compliance with a predetermined network discovery protocol and is described in a markup language;

a parser that parses the obtained message for interpreting contents of the obtained message;

a first extracting unit that extracts first identification information including manufacturer information and model information of the peripheral device from the obtained message which is in compliance with the predetermined network discovery protocol according to the parsing;

a second extracting unit that extracts a network address of the peripheral device from the obtained message which is in compliance with the predetermined network discovery protocol according to the parsing;

a generating unit that generates second identification information which indicates a manufacturer and a model of the peripheral device, by using the extracted first identification information of the peripheral device extracted from the message which is in compliance with the predetermined network discovery protocol, wherein the second identification information is information suitable for controlling the installation by said installer;

an inputting unit that inputs the generated second identification information to the installer;

an installation control unit that controls the installer to start installation of the control program into the information processing apparatus by using the second identification information input by the inputting unit; and a setting unit that sets the network address of the peripheral device extracted by the second extracting unit from the obtained message which is in compliance with the predetermined network discovery protocol to the control program installed by the installer.

10. The information processing apparatus according to claim 9, further comprising a designation unit that designates the peripheral device to be controlled by the control program in accordance with the message obtained by said obtaining unit in response to a search request previously issued by the information processing apparatus, wherein said installation control unit controls the installer to start the installation of the control program for controlling the peripheral device in response to the designation input by said designation unit.

11. The information processing apparatus according to claim 10, wherein said designation unit designates a peripheral device which provides a specific service.

12. The information processing apparatus according to claim 9, further comprising:

a display control unit that displays a service on a display of the information processing apparatus, and an issuing unit that issues a search request for searching for available peripheral devices on the network when an item, which is displayed on the display, for designating a search and addition is input, wherein said display control unit displays a list of peripheral devices on the display of the information processing apparatus in accordance with a plurality of messages obtained by said obtaining unit in response to the search request, and said installation control unit, in response to the selection of a peripheral device from the list of peripheral devices displayed by said display control unit, controls the installer to start the installation of the control program for controlling the selected peripheral device.

13. The information processing apparatus according to claim 9, wherein, said installation control unit, using information indicating a storage region for storing the control program, the information being included in the obtained message, obtains the control program installed by the installer from the storage region.

14. The information processing apparatus according to claim 9, further comprising:

a determination unit that determines whether or not the control program for controlling the peripheral device is stored in the information processing apparatus, wherein, when said determination unit determines that the control program is stored in the information processing apparatus, said installation control unit obtains the control program stored in the information processing apparatus and controls the installer to start the installation of the obtained control program, and when said determination unit determines that the control program is not stored in the information processing apparatus, said installation control unit obtains the control program using URL information or an UNC (Universal Naming Convention) path name which indicates a storage region for storing the control program, the URL information or the UNC path name being included in the message and controls the installer to start the installation of the obtained control program.

15. The information processing apparatus according to claim 9, wherein said installation control unit, when the second identification information is input to the installer, using the input second identification information, controls the installer to call an application program interface of an operating system.

16. The information processing apparatus according to claim 9, wherein the information processing apparatus can use a plurality of network discovery protocols, and said first extracting unit, even if the message obtained by said obtaining unit is in compliance with any of the plurality of network discovery protocols, extracts the first identification information including the manufacturer information and the model information of the peripheral device from the obtained message.

17. A non-transitory computer-readable storage medium on which is stored a computer readable program for executing an information processing method for an information processing apparatus which communicates with a peripheral device via a network and which includes an installer for a control program for controlling the peripheral device, the information processing method comprising:

an obtaining step of obtaining a message from the peripheral device, wherein the message is in compliance with a predetermined network discovery protocol and is described in a markup language;

a parse step of parsing the obtained message for interpreting contents of the obtained message;

a first extracting step of extracting first identification information including manufacturer information and model information of the peripheral device from the obtained message which is in compliance with the predetermined network discovery protocol according to the parsing;

a second extracting step of extracting a network address of the peripheral device from the obtained message which is in compliance with the predetermined network discovery protocol according to the parsing;

a generating step of generating second identification information which indicates a manufacturer and a model of the peripheral device by using the extracted first identification information of the peripheral device extracted from the message which is in compliance with the predetermined network discovery protocol, wherein the second identification information is information suitable for controlling the installation by said installer;

an inputting step of inputting the generated second identification information to the installer;

an installation controlling step of controlling the installer to start installation of the control program into the information processing apparatus by using the second identification information input in said inputting step; and a setting step of setting the network address of the peripheral device extracted in the second extracting step from the obtained message which is in compliance with the predetermined network discovery protocol to the control program installed by the installer.

18. The computer-readable storage medium according to claim 17, further comprising a designation step of designating the peripheral device to be controlled by the control program in accordance with the message obtained in said obtaining step in response to a search request previously issued by the information processing apparatus, wherein, in said installation controlling step, the installer is controlled to start the installation of the control program for controlling the peripheral device in response to the designation input in said designation step.

19. The computer-readable storage medium according to claim 18, further comprising:

a display controlling step of displaying a service on a display of the information processing apparatus, and an issuing step of issuing a search request for searching for available peripheral devices on the network when an item, which is displayed on the display, for designating a search and addition is input, wherein, in said display controlling step, a list of peripheral devices is displayed on the display of the information processing apparatus in accordance with a plurality of messages obtained in said obtaining step in response to the search request, and in said installation control step, in response to the selection of a peripheral device from the list of peripheral devices displayed in said display controlling step, the installer is controlled to start the installation of the control program for controlling the selected peripheral device.

20. The computer-readable storage medium according to claim 18, wherein, in said designation step, a peripheral device which provides a specific service is designated.

21. The computer-readable storage medium according to claim 17, wherein, in said installation controlling step, using information indicating a storage region for storing the control program, the information being included in the obtained message, the control program installed by the installer is obtained from the storage region.

22. The computer-readable storage medium according to claim 17, further comprising:

a determination step of determining whether or not the control program for controlling the peripheral device is stored in the information processing apparatus, wherein, when it is determined in said determination step that the control program is stored in the information processing apparatus, in said installation controlling step, the control program stored in the information processing apparatus is obtained and the installer is controlled to start the installation of the obtained control program, and when it is determined in said determination step that the control program is not stored in the information processing apparatus, in said installation controlling step, the control program is obtained using URL information or an UNC (Universal Naming Convention) path name which indicates a storage region for storing the control program, the URL information or the UNC path name being included in the message and the installer is controlled to start the installation of the obtained control program.

23. The computer-readable storage medium according to claim 17, wherein, in said installation controlling step, when the second identification information of the peripheral device is input to the installer, using the input second identification information, the installer is controlled to call an application program interface of an operating system.

* * * * *